United States Patent [19]
Abe

[11] Patent Number: 6,049,634
[45] Date of Patent: Apr. 11, 2000

[54] IMAGE COMPRESSION DEVICE

[75] Inventor: Nobuaki Abe, Hokkaido, Japan

[73] Assignee: Asahi Kogaku Kogyo Kabushiki Kaisha, Tokyo, Japan

[21] Appl. No.: 08/919,337

[22] Filed: Aug. 28, 1997

[30] Foreign Application Priority Data

Aug. 29, 1996 [JP] Japan ................................. 8-247259

[51] Int. Cl.[7] ................................................... G06K 9/36
[52] U.S. Cl. .......................... 382/250; 382/248; 382/251; 348/390; 348/405; 348/421
[58] Field of Search .................................... 382/250, 251, 382/248, 239; 348/405, 419

[56] References Cited

U.S. PATENT DOCUMENTS

| | | | |
|---|---|---|---|
| 5,497,246 | 3/1996 | Abe | 382/248 |
| 5,517,327 | 5/1996 | Nakatani et al. | 382/232 |
| 5,559,557 | 9/1996 | Kato | 348/405 |
| 5,666,209 | 9/1997 | Abe | 348/405 |
| 5,724,453 | 3/1998 | Ratnakar et al. | 382/251 |
| 5,737,451 | 4/1998 | Gandhi et al. | 382/268 |
| 5,832,128 | 11/1998 | Suzuki | 382/246 |

FOREIGN PATENT DOCUMENTS 7135568 11/1994 Japan .

*Primary Examiner*—Christopher S. Kelley
*Assistant Examiner*—Sheela Chawan
*Attorney, Agent, or Firm*—Greenblum & Bernstein, P.L.C.

[57] ABSTRACT

The image compression device comprises a DCT processing unit, a statistical value processing unit, a quantization table generation unit, a quantization processing unit and a compression processing unit. In the DCT processing unit, luminance data and color difference data are subjected to a two-dimensional DCT to obtain DCT coefficients. In the statistical value processing unit, the DCT coefficients are subjected to a quantization and a dequantization so that a quantization error is calculated for every spatial frequency. In the quantization table generation unit, a quantization coefficient is obtained such that the quantization error becomes a minimum for every spatial frequency, so that a quantization table composed of the quantization coefficients is generated. The DCT coefficients are quantized using the quantization table in the quantization processing unit. In the compression processing unit, the quantized DCT coefficients are compressed, and recorded in a recording medium together with the quantization table.

6 Claims, 4 Drawing Sheets

IMAGE COMPRESSION DEVICE

BACKGROUND OF THE INVENTION

1. Field of the Invention

The present invention is related to a device which compresses color still image data, for example, in accordance with a JPEG (Joint Photographic Expert Group) algorithm, and records the compressed image data in a recording medium.

2. Description of the Related Art

A standard algorithm, for the encoding of high resolution images and the transfer of that information through telecommunication transmission channels, has been recommended by the JPEG. In order to enable a large-scale data compression, the baseline process of the JPEG algorithm breaks down the original image data into components on a spatial frequency axis using a two-dimensional discrete cosine transformation (two-dimensional DCT) process. Thereafter, the data expressed on the spatial frequency axis is quantized by using a quantization table. The quantized data is then encoded using a Huffman table to generate compressed image data, which are recorded in a recording medium.

When the original image is reproduced from the compressed image data, an inverse process to that described above is performed. Namely, the compressed image data are decoded, are dequantized using the quantization table, and are then subjected to a two-dimensional inverse discrete cosine transformation (two-dimensional IDCT).

Due to carrying out the data compression process, a part of the image data is lost. Accordingly, the quality of the reproduced image obtained by the expansion process is lowered in comparison with the original image. On the other hand, the compression process and the expansion process can then be carried out repeatedly any number of times. However, if the quantization table used in the later compression process is different from that used in the first compression process, the image deterioration is advanced (i.e., gets worse) due to the compression process, even if the amount of data obtained by the compression process is approximately the same.

SUMMARY OF THE INVENTION

Accordingly, an object of the present invention is to provide an image compression device by which, even when the quantization table used in a previous compression process is unknown, the next compression process is carried out using a quantization table which is as close to the previous quantization process as possible, so that the deterioration of the image quality can be limited as much as possible.

According to the present invention, an image compression device, including a first quantization table composed of first quantization coefficients for performing an image compression process, is provided in which image data corresponding to one image are divided into a plurality of blocks, and each of the blocks is then subjected to the image compression process. The device comprises a two-dimensional discrete cosine transformation (two-dimensional DCT) processor, a statistical value calculation processor, a quantization table generating processor and a compression processor.

The two-dimensional DCT processor performs a two-dimensional DCT on the image data to obtain DCT coefficients for each of the blocks. The statistical value calculation processor performs a statistical value calculation process, which is related to a quantization and a dequantization, on all of the blocks for every spatial frequency to obtain a statistical value for every spatial frequency. The quantization table generating processor obtains a second quantization coefficient for every spatial frequency in such a manner that the statistical value becomes a minimum, so that a second quantization table composed of a plurality of the second quantization coefficients is generated. The compression processor quantizes the DCT coefficients to obtain quantized DCT coefficients, compresses the quantized DCT coefficients to obtain compressed image data, and records the compressed image data in a recording medium. The compression processor uses the first quantization table for the quantization and then records the first quantization table in the recording medium when the second quantization table cannot be generated by the quantization table generating processor. The compression processor uses the second quantization table for the quantization and then records the second quantization table in the recording medium when the second quantization table can be generated by the quantization table generating processor.

Further, according to the present invention, there is provided an image compression device which divides image data corresponding to one image into a plurality of blocks, executes a two-dimensional DCT on the image data for each of the blocks to obtain DCT coefficients, can quantize the DCT coefficients using a first quantization table composed of first quantization coefficients, for each of the blocks, to obtain quantized DCT coefficients, and compresses the quantized DCT coefficients for each of the blocks. The device comprises a statistical value calculation processor, a quantization table generating processor, and a compression processor.

The statistical value calculation processor performs a statistical value calculation process, which is related to a quantization and a dequantization, on all of the blocks for every spatial frequency to obtain a statistical value for every spatial frequency. The quantization table generating processor obtains a second quantization coefficient for every spatial frequency in such a manner that the statistical value becomes a minimum, so that a second quantization table composed of a plurality of the second quantization coefficients is generated. The compression processor either quantizes the DCT coefficients to obtain quantized DCT coefficients using the second quantization table, compresses the quantized DCT coefficients to obtain compressed image data, and records the compressed image data and the second quantization table in a recording medium, when the second quantization table can be generated, or quantizes the DCT coefficients to obtain quantized DCT coefficients using the first quantization table, compresses the quantized DCT coefficients to obtain compressed image data, and records the compressed image data and the first quantization table in the recording medium, when the second quantization table cannot be generated.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
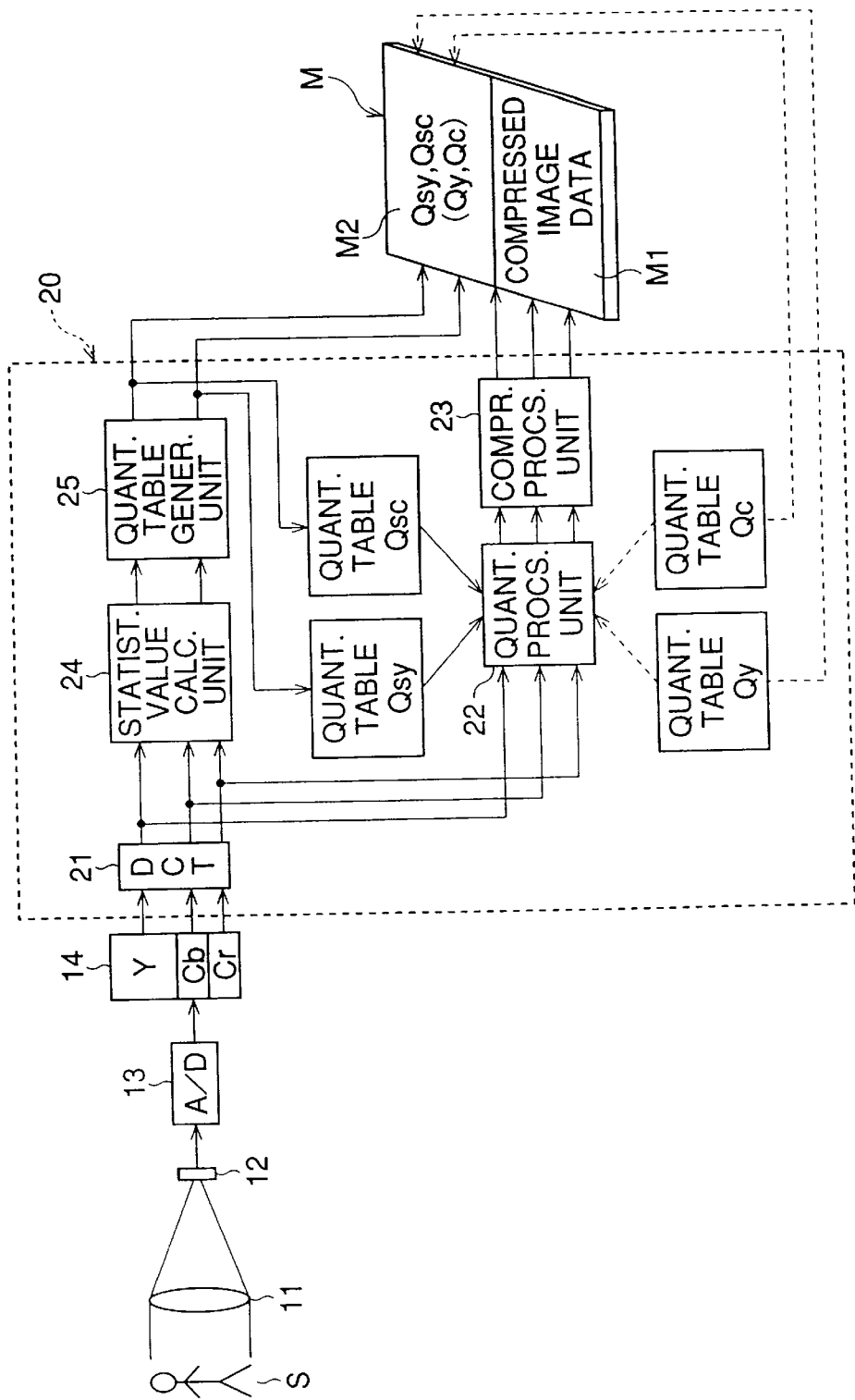
FIG. 1 is a block diagram showing an image compression device of an embodiment of the present invention.

The present invention will be described below with reference to embodiments shown in the drawings.

FIG. 1 is a block diagram of a still video camera having an image compression device of an embodiment of the present invention, by which luminance data and color difference data, which correspond to an original still image, are compressed according to the JPEG algorithm.

Light reflected from a subject S passes through an imaging optical system 11, such that the reflected light is focused on a CCD (charge coupled device) 12. Multiple photoelectric conversion elements are provided on the light receiving surface of the CCD 12. A color filter element (not shown) of red, green or blue is placed on each photoelectric conversion element, which corresponds to one pixel. Thus, the CCD 12 produces charges, which are representative of the quantity of light incident thereon, and outputs an analog pixel signal to an A/D converter 13.

The A/D converter 13 converts the analog pixel signal to a digital pixel signal which is inputted to a signal processing unit (not shown). The signal processing unit converts the pixel signals into luminance data Y and color difference data Cb and Cr, which are stored in an image memory 14. The image memory 14 is divided into a plurality of memory areas, which are independent from each other, and each of which has a capacity of one frame's worth of image data. The luminance data Y and the color difference data Cb and Cr, stored in the image memory 14, are inputted to a DCT processing unit 21 included in the image compression device 20, so that a data compression process is performed on the signals Y, Cb and Cr. Note that, although a single DCT processing unit 21 is shown in FIG. 1, actually, a DCT processing unit is independently provided for the luminance data Y and the color difference data Cb and Cr.

Figure 2:
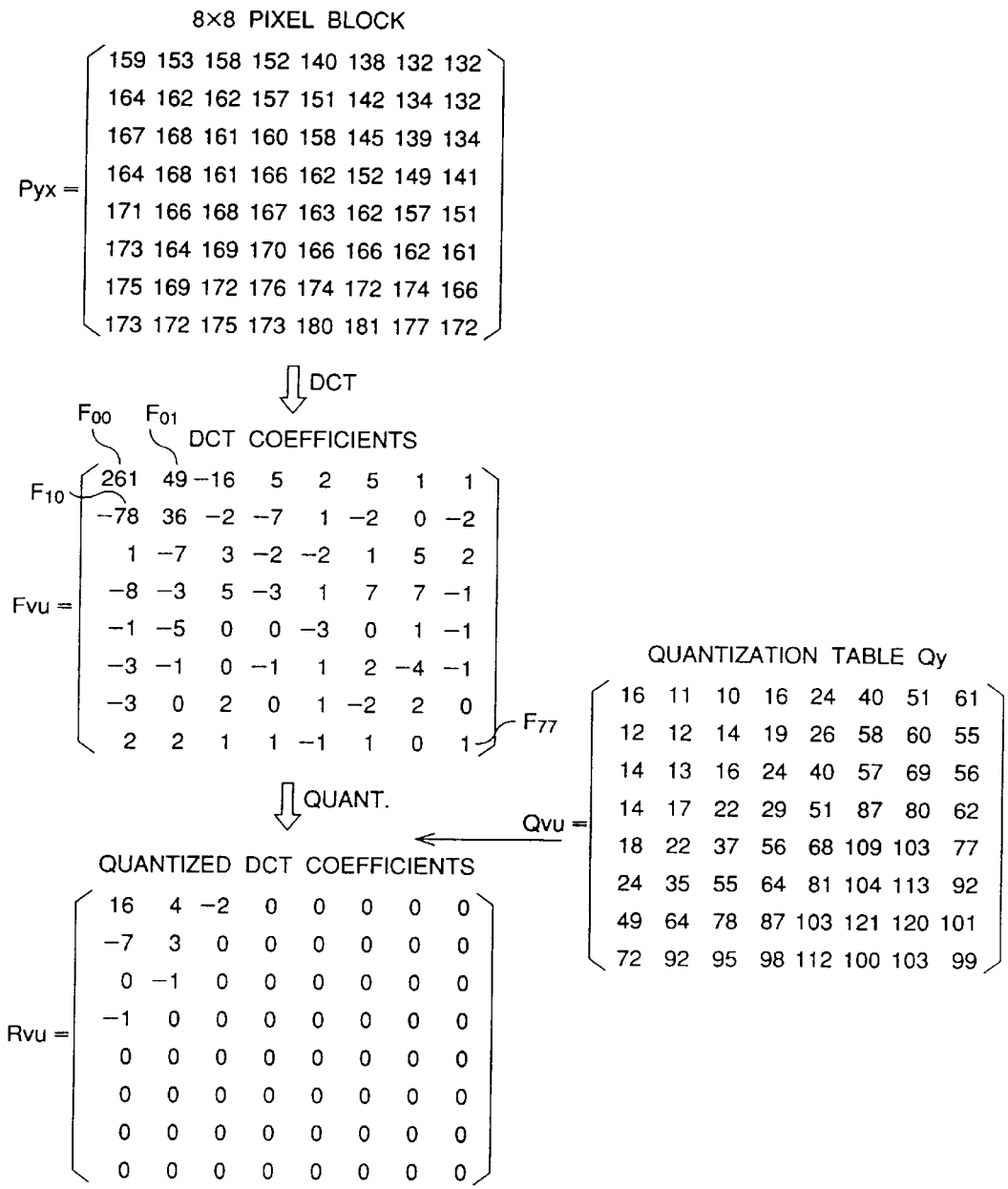
FIG. 2 is a view showing, as an example, pixel values Pyx of an 8×8 pixel block, DCT coefficients Fvu, quantized DCT coefficients Rvu and a quantization table Qvu.

In the image compression device 20, the image data, such as the luminance data Y and the color luminance data Cb and Cr, are divided into a predetermined number of pixel blocks collectively being commensurate to one frame. Each block is then individually processed. As shown in FIG. 2, each pixel block is composed of 8×8 pixel data Pyx, which indicate the luminance data Y, for example.

In the DCT processing unit 21, every block of pixel data of the luminance data Y is subjected to a two-dimensional DCT, so that a DCT coefficient, for every spatial frequency of the luminance data Y, is obtained. The DCT coefficients of the luminance data Y are quantized in a quantization processing unit 22, using a first quantization table Qy or a second quantization table Qsy, so that each DCT coefficient is converted to a quantized DCT coefficient. The quantized DCT coefficients of the luminance data Y are then compressed by being encoded in a compression processing unit 23, in accordance with the JPEG algorithm, so that the compressed image data are recorded in a compressed image recording area M1 of a recording medium M.

Similar to the luminance data Y, the color difference data Cb and Cr are converted to DCT coefficients in the DCT processing unit 21, and are then quantized in the quantization processing unit 22, using a first quantization table Qc or a second quantization table Qsc, so that each DCT coefficient is converted to a quantized DCT coefficient. The quantized DCT coefficients of the color difference data Cb and Cr are then compressed by being encoded in the compression processing unit 23, in accordance with the JPEG algorithm, so that the compressed image data are recorded in the compressed image recording area M1 of the recording medium M.

The first quantization tables Qy and Qc are default quantization tables, each of which is usually used in the JPEG algorithm. Conversely, the second quantization tables Qsy and Qsc are generated in a quantization table generation unit 25, based on a statistical value obtained by a statistical value calculation unit 24, as described later.

FIG. 2 shows, as an example, pixel values Pyx of an 8×8 pixel block, DCT coefficients Fvu, quantized DCT coefficients Rvu and a default quantization table Qy, for quantizing the luminance data Y. In the pixel values Pyx, the suffix "y" indicates a vertical position in the 8×8 pixel block. Values of "y" (0, 1, 2, . . . 7) ascend from the upper-position to the lower-position. The suffix "x" indicates a horizontal position in the 8×8 pixel block. Values of "x" (0, 1, 2, . . . 7) ascend from the left-position to the right-position. Suffixes "v" and "u" correspond to vertical and horizontal positions of the 64 DCT coefficients, which are arranged in an 8×8 matrix. Values of "v" (0, 1, 2, . . . 7) ascend from the upper-position to the lower-position. Values of "u" (0, 1, 2, . . . 7) ascend from the left-position to the right-position.

The pixel values Pyx are converted to 64 (8×8) DCT coefficients Fvu by the two-dimensional DCT. The two-dimensional DCT is expressed by the following equation (1):

$$Fvu = \frac{1}{4} Cu\, Cv \sum_{y=0}^{7} \sum_{x=0}^{7} Pyx \cdot \cos(2x+1)u\frac{\pi}{16} \cdot \cos(2y+1)v\frac{\pi}{16} \quad (1)$$

wherein Cu, $$Cv = \frac{1}{\sqrt{2}} \quad : \quad u, v = 0$$
$$\phantom{Cv} = 1 \quad : \quad u, v \neq 0$$

Of these DCT coefficients, DCT coefficient $F_{00}$ at position (0,0) is a DC (Direct Current) component, while the remaining 63 DCT coefficients Fvu are AC (Alternating Current) components. The AC components show how many higher spatial frequency components there are, in the 8×8 pixel block of image data, from the coefficients $F_{01}$ and $F_{10}$ to the coefficient $F_{77}$. The DC component shows the average value of the spatial frequency components of the 8×8 pixel block as a whole. Each DCT coefficient Fvu corresponds to a predetermined spatial frequency.

The quantization table Qy is composed of 64 quantization coefficients Qvu. The equation for quantization of the DCT coefficients Fvu, using the quantization table, is defined as follows:

$$Rvu = \text{round }(Fvu/Qvu)(0 \leq u, v \leq 7)$$

The term "round", in this equation, is an approximation function which approximates, to the nearest integer, the value of the argument. Thus, if the argument is less than 0.5, the value is rounded down to the nearest integer. If the argument is greater than or equal to 0.5, the value is rounded up to the nearest integer. For example, the value 3.49 is rounded down to 3, whereas 3.50 is rounded up to 4.

Namely, the quantized DCT coefficients Rvu, shown in FIG. 2, are obtained by dividing each of the DCT coefficients Fvu by the corresponding quantization coefficients Qvu, and rounding off.

The quantized DCT coefficients Rvu are subjected to Huffman encoding and are recorded in the recording medium M, by the compression processing unit 23. Since the Huffman encoding is well known, a detailed explanation thereof is omitted in this specification.

The generation processes of the second quantization tables Qsy and Qsc executed in the statistical value processing unit 24 and the quantization table generation unit 25 are described below.

Figure 3:
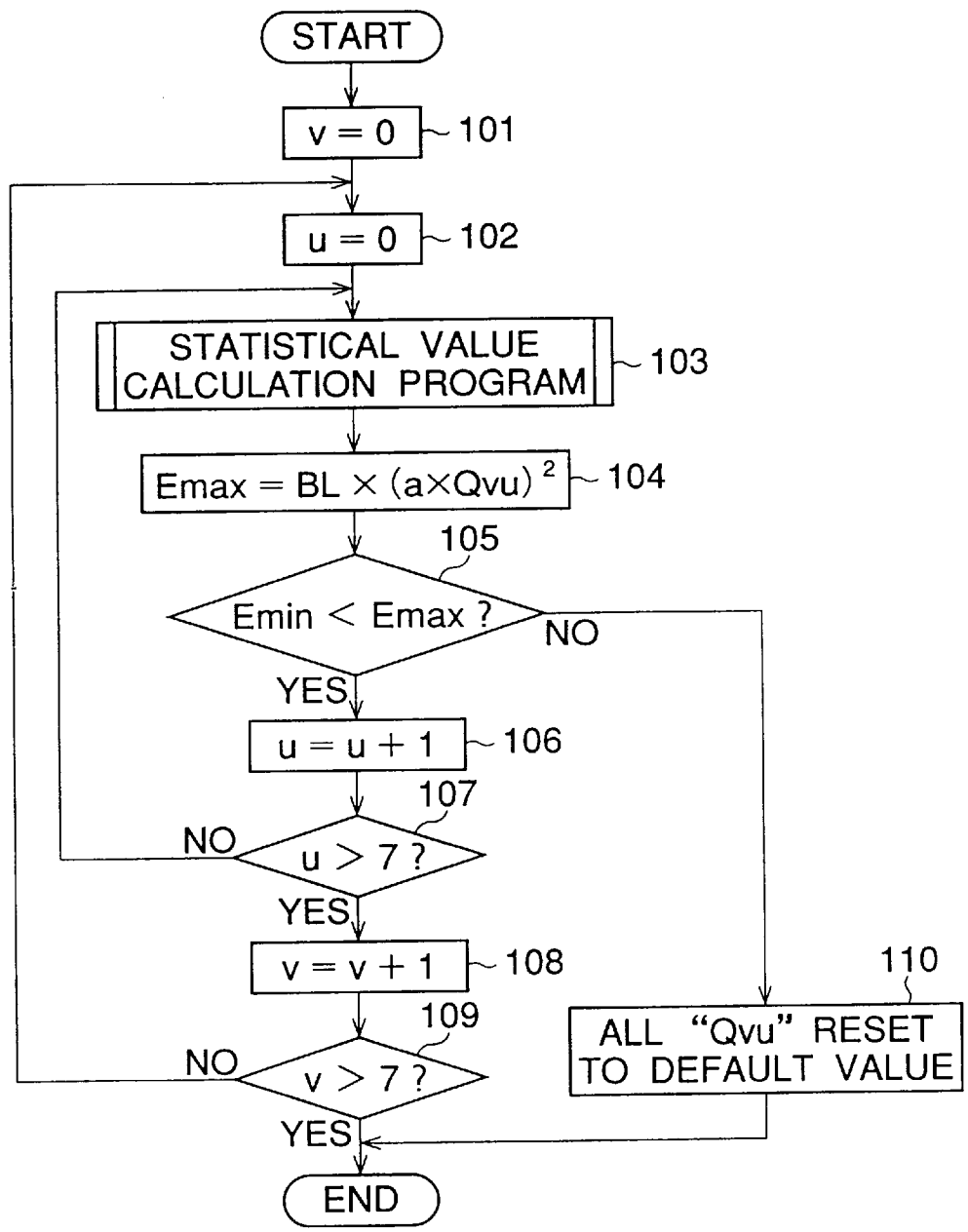
FIG. 3 is a flow chart of a quantization table generation program executed in a quantization table generation unit.
Figure 4:
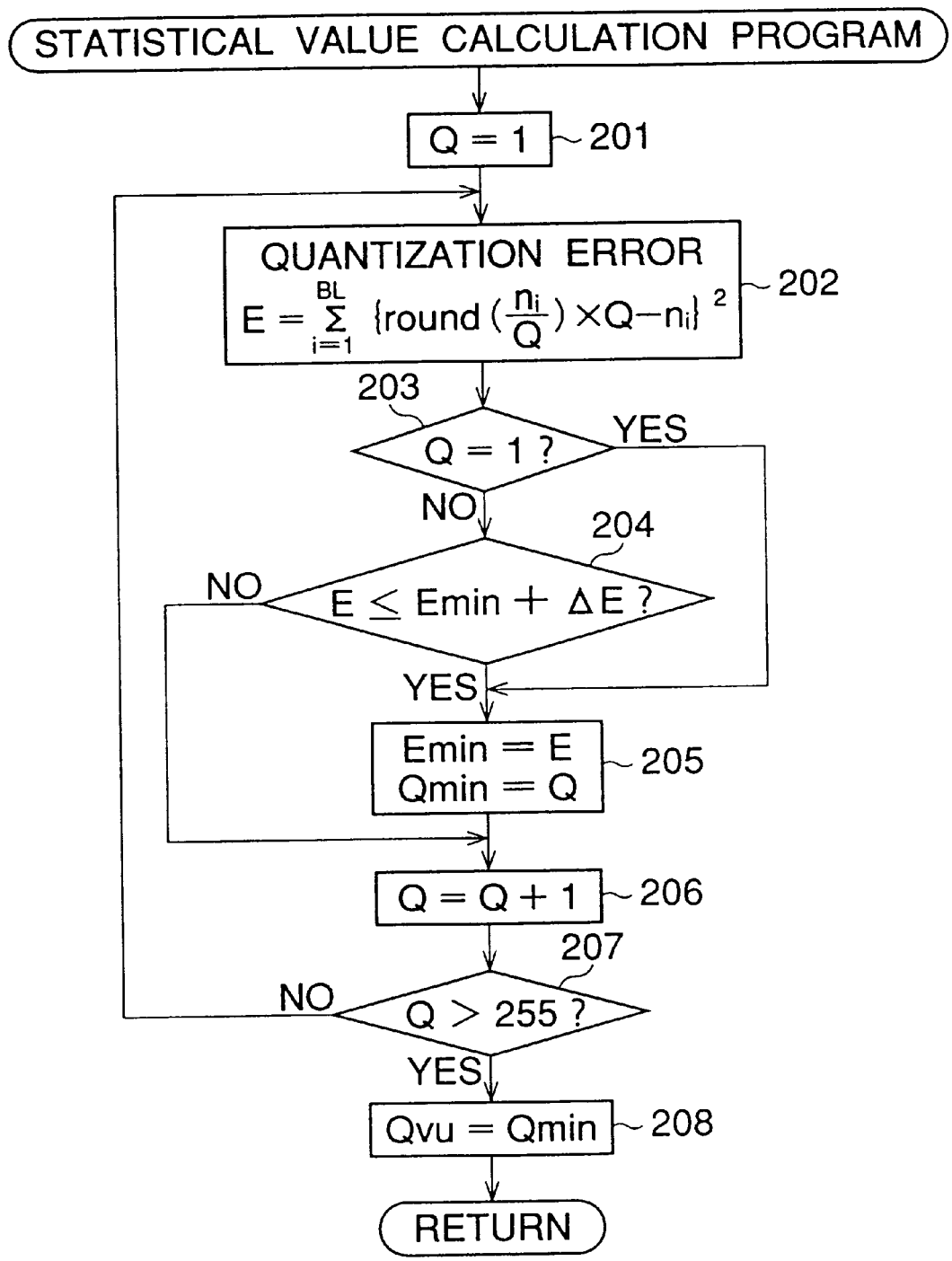
FIG. 4 is a flow chart of a statistical value calculation program executed in a statistical value calculation unit.

FIG. 3 shows a flow chart of a quantization table generation program executed in the quantization table generation unit 25. FIG. 4 shows a flow chart of a statistical value calculation program executed in the statistical value calculation unit 24. In the embodiment, the program shown in FIG. 4 is a subroutine executed in the program shown in FIG. 3, and in FIG. 1, the statistical value calculation unit 24 is a separate unit from the quantization table generation unit 25. These constructions, however, can be changed according to necessity. Namely, for example, it is possible that the statistical value calculation unit 24 and the quantization table generation unit 25 can be constructed in a single processing unit, and the program shown in FIG. 4 can be incorporated into the program shown in FIG. 3.

In FIG. 3, in Step 101, parameter "v", which indicates the vertical position of the 8×8 matrix is set to 0. In Step 102, parameter "u", which indicates the horizontal position of the 8×8 matrix is set to 0. In step 103, a program for calculating the quantization table Qvu, i.e., the statistical value calculation program shown in FIG. 4, is executed. In the statistical value calculation program, a statistical calculation process, which is related to a quantization and a dequantization, is performed for every spatial frequency of all of the blocks of one frame image, so that a statistical value is obtained for every spatial frequency, as described below with reference to FIG. 4.

In Step 201, an initial value of quantization coefficient "Q" is set to 1. In Step 202, a quantization error "E" is calculated according to the following equation (2):

$$\sum_{i}^{BL} \sum (\text{round }(n_i/Q) \times Q - n_i)^2 \quad (2)$$

wherein the term "round" is an approximation function which approximates, to the nearest integer, the value of the argument; "i" implies a serial number of a block forming a part of one frame image; "$n_i$" implies a DCT coefficient (see FIG. 2) of the "i"th block corresponding to the previously set ("u" and "v") spatial frequency position; and $$\sum_{i=1}^{BL}$$

implies to sum up the value of the argument, calculated for the set spatial frequency in each block, for a total number of blocks (denoted as BL hereinafter) corresponding to one frame image. Namely, according to equation (2), the statistical value (i.e., the quantization error "E") is obtained which is a total sum of the square of the difference between the DCT coefficients "$n_i$" and the corresponding dequantized DCT coefficients obtained by quantizing and rounding off the DCT coefficients "$n_i$", by using quantization coefficients "Q" to generate integer quantized DCT coefficients, and then by multiplying the integer quantized DCT coefficients by the quantization coefficients "Q".

When it is determined in Step 203 that the quantization coefficient "Q" is 1, the process goes to Step 205, in which the initial values of the quantization coefficient "Q" and the quantization error "E" are set as a minimum value "Emin" of the quantization error and a minimum value "Qmin" of the quantization coefficient, respectively. In Step 206, the quantization coefficient "Q" is incremented by 1. In Step 207, it is determined whether the quantization coefficient "Q" exceeds 255. When the quantization coefficient "Q" is less than or equal to 255, the process goes back to 202, so that the operations described above are again performed.

When it is determined in Step 203 that the quantization coefficient "Q" is greater than 1, the process goes to Step 204, in which it is determined whether the quantization error "E" is less than or equal to the sum of a minimum value "Emin" and an allowable error "ΔE". The reason why the quantization error "E" is compared with "Emin+ΔE" is that an optimum quantization coefficient "Qvu" is surely set in Step 208. For example, if the minimum value "Emin" set in Step 205 is too small when the quantization coefficient "Q" is 1, the quantization coefficient "Qvu" obtained in Step 208 is 1, and thus, a quantization coefficient, which is greater than 1, cannot be obtained.

When it is determined in Step 204 that the quantization error "E" is less than or equal to "Emin+ΔE", Step 205 is executed in which the present quantization error "E" and the present quantization coefficient "Q" are set as the minimum values "Emin" and "Qmin", respectively. Conversely, when it is determined in Step 204 that the quantization error "E" is greater than "Emin+ΔE", Step 205 is skipped. Then, the quantization coefficient "Q" is incremented by 1 in Step 206. When it is determined in Step 207 that the quantization coefficient "Q" is less than or equal to 255, Steps 202 through 206 are again executed.

Thus, when the quantization coefficient "Q" exceeds 255, since the calculations of the quantization errors "E" for all of the quantization coefficients 1 through 255 have been completed, the process goes from Step 207 to Step 208, so that the present minimum value "Qmin" is set to the quantization coefficient "Qvu" at the spatial frequency determined by the parameters "v" and "u". Thus, this statistical value calculation program ends.

Then, Step 104 shown in FIG. 3 is executed, in which the maximum value "Emax" of the quantization coefficient is obtained from the following equation:

$$Emax = BL \times (a \times Qvu)^2$$

wherein "BL" is the total number of blocks of one frame image, and "a" is a constant value (⅛, for example). A maximum value "Emax" of the quantization error is a standard value, based on which it is determined whether the quantization coefficient "Qvu", set by the statistical value calculation program shown in FIG. 4, has a proper value. Namely, in Step 105, it is determined whether the minimum value "Emin" is less than the maximum value "Emax". If the minimum value "Emin" is greater than or equal to the maximum value "Emax", it is determined that the statistical value calculation program shown in FIG. 4 could not obtain a proper quantization coefficient "Qvu". In this case, Step 110 is executed, so that a message, implying that the second quantization tables (Qsy, Qsc) could not be generated, is indicated on a surface of a display device, for example, and all of the quantization coefficients "Qvu" are reset to the values of the default quantization tables (Qy, Qc). Then this program ends.

Conversely, when it is determined in Step 105 that the minimum value "Emin" is less than the maximum value "Emax", the process goes to Step 106 in which parameter "u" is incremented by 1. In Step 107, it is determined whether parameter "u" exceeds 7. When the parameter is less than or equal to 7, the process goes back to Step 103, so that Steps 103 through 106 are executed for the next parameter "u".

When it is determined in Step 107 that parameter "u" exceeds 7, parameter "v" is incremented by 1 in Step 108. In Step 109, it is determined whether parameter "v" is greater than 7. When it is determined in Step 107 that parameter "v" is not greater than 7, the process goes back to Step 102, so that Steps 102 through 108 are executed for the next parameter.

Conversely, when parameter "v" is greater than 7, since the calculations of the quantization coefficients "Qvu" have been completed for all of the parameters "u" and "v", this program ends.

The quantization table generation program and the statistical value calculation program shown in FIGS. 3 and 4 are carried out to obtain the second quantization table (Qsy) for the luminance data Y and the second quantization table (Qsc) for the color difference data Cb and Cr, respectively.

The second quantization tables (Qsy, Qsc) obtained according to the quantization table generation program and the statistical value calculation program are used for quantizing the DCT coefficients of the luminance data Y and the color difference data Cb and Cr, respectively, in the quantization process unit 22. Conversely, when the second quantization tables (Qsy, Qsc) have not been generated, i.e., when Step 110 shown in FIG. 3 has been executed, the default quantization tables (Qy, Qc) are used.

As described above, according to the embodiment, the quantization coefficients "Qvu", by which the quantization errors "E" (the statistical values) become substantially the minimum, are obtained, and the second quantization tables (Qsy, Qsc) composed of these quantization coefficients are generated. Since the quantization errors "E" have the minimum values, respectively, the second quantization tables (Qsy, Qsc) should be close to the previous quantization tables which were used in the previous compression process for the image. When such second quantization tables (Qsy, Qsc) can be generated, the DCT coefficients are quantized using the second quantization tables to obtain quantized DCT coefficients, which are then subjected to a compression process so that compressed image data are obtained. Then, the compressed image data and the second quantization tables (Qsy, Qsc) are recorded in the recording medium M.

Conversely, when the second quantization tables (Qsy, Qsc) cannot be generated, the DCT coefficients are quantized using the first quantization tables (Qy, Qc) to obtain quantized DCT coefficients. The quantized DCT coefficients are compressed to obtain the compressed image data, which are then recorded in the recording medium M together with the first quantization tables (Qy, Qc).

Thus, due to the second quantization tables (Qsy, Qsc), the quantization errors "E" become the minimum, with respect to all of the blocks of one frame image. Therefore, even when a compression process and an expansion process are performed using the second quantization tables (Qsy, Qsc), as far as is possible, loss of the original image information is prevented, so that the deterioration of the quality of the image obtained by expanding the compressed image data can be limited.

Note that, as a method of image compression, an image compression other than the JPEG algorithm can be applied.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-247259 (filed on Aug. 29, 1996) which is expressly incorporated herein by reference, in its entirety.

I claim:

1. An image compression device, in which image data corresponding to one image is divided into a plurality of blocks, each of said blocks being subjected to an image compression process, said image compression device being provided with a first quantization table composed of first quantization coefficients for performing said image compression process, said image compression device comprising:

a two-dimensional discrete cosine transformation (two-dimensional DCT) processor that performs a two-dimensional DCT on said image data to obtain DCT coefficients for each of said plurality of blocks;

a statistical value calculation processor that performs a statistical value calculation process, related to a quantization and a dequantization, on all of said plurality of blocks for every spatial frequency to obtain a statistical value for every spatial frequency;

a quantization table generating processor that obtains a second quantization coefficient for every spatial frequency in such a manner that said statistical value becomes a minimum, so that a second quantization table composed of a plurality of said second quantization coefficients is generated; and a compression processor that quantizes said DCT coefficients to obtain quantized DCT coefficients, compresses said quantized DCT coefficients to obtain compressed image data, and records said compressed image data in a recording medium, said compression processor comprising:

a determining processor that determines whether said second quantization table is proper or not, said compression processor using said first quantization table for said quantization and then recording said first quantization table in said recording medium when said determining processor determines that said second quantization table is improper, said compression processor using said second quantization table for said quantization and then recording said second quantization table in said recording medium when said determining processor determines that said second quantization table is proper.

2. A device according to claim 1, wherein said statistical value comprises a total sum of a square of a difference between said DCT coefficients and corresponding dequantized DCT coefficients for all of said blocks, said dequantized DCT coefficients being obtained by quantizing and rounding off said DCT coefficients, using quantization coefficients to generate integer quantized DCT coefficients, and then multiplying said integer quantized DCT coefficients by said quantization coefficients.

3. A device according to claim 1, wherein said quantization table generation processor obtains said second quantization coefficients in such a manner that said total sum becomes a minimum.

4. A device according to claim 3, wherein said quantization table generation processor determines that said second quantization table cannot be generated when said total sum corresponding to said minimum is less than a standard value.

5. A device according to claim 4, wherein said standard value is obtained by the following equation:

$$Emax = BL \times (a \times Qvu)^2$$

wherein "Emax" is said standard value, "BL" is a total number of blocks, and "Qvu" is a quantization coefficient.

6. An image compression device that divides image data corresponding to one image into a plurality of blocks, executes a two-dimensional DCT on said image data for each of said blocks to obtain DCT coefficients, quantizes said DCT coefficients using a first quantization table composed of first quantization coefficients, for each of said plurality of blocks, to obtain quantized DCT coefficients, and compresses said quantized DCT coefficients for each of said plurality of blocks, said image compression device comprising:

a statistical value calculation processor that performs a statistical value calculation process, related to a quantization and a dequantization, on all of said plurality of blocks for every spatial frequency to obtain a statistical value for every spatial frequency;

a quantization table generating processor that obtains a second quantization coefficient for every spatial frequency in such a manner that said statistical value becomes a minimum, so that a second quantization table composed of a plurality of said second quantization coefficients is generated;

a determining processor that determines whether said second quantization table is proper, and selects said second quantization table as a selected quantization table when said second quantization table is proper, but selects said first quantization table as said selected quantization table when said second quantization table is improper, and a compression processor that quantizes said DCT coefficients to obtain quantized DCT coefficients using said selected quantization table, compresses said quantized DCT coefficients to obtain compressed image data, and records said compressed image data and said selected quantization table in a recording medium.

* * * * *